United States Patent
Sablone

(10) Patent No.: US 12,527,696 B2
(45) Date of Patent: Jan. 20, 2026

(54) METHOD AND APPARATUS FOR PRODUCING ABSORBENT SANITARY ARTICLES

(71) Applicant: Fameccanica.Data S.p.A., San Giovanni Teatino (IT)

(72) Inventor: Gabriele Sablone, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 143 days.

(21) Appl. No.: 18/492,899

(22) Filed: Oct. 24, 2023

(65) Prior Publication Data

US 2024/0130900 A1 Apr. 25, 2024
US 2024/0225914 A9 Jul. 11, 2024

(30) Foreign Application Priority Data

Oct. 25, 2022 (IT) .................. 102022000021942

(51) Int. Cl.
*A61F 13/15* (2006.01)

(52) U.S. Cl.
CPC .. *A61F 13/15601* (2013.01); *A61F 13/15739* (2013.01)

(58) Field of Classification Search
CPC .......... A61F 13/15739; A61F 13/15601; A61F 13/495; B29C 69/006; Y10T 156/1077; Y10T 156/1008; Y10T 156/101; Y10T 156/1025
USPC .......... 156/210, 292, 229, 201, 461
See application file for complete search history.

(56) References Cited

U.S. PATENT DOCUMENTS

| | | | | |
|---|---|---|---|---|
| 4,240,866 A | * | 12/1980 | Rega | B29C 69/006 156/496 |
| 5,102,486 A | * | 4/1992 | Midgley | A61F 13/15756 156/519 |
| 5,755,902 A | * | 5/1998 | Reynolds | A61F 13/15707 156/472 |
| 6,197,138 B1 | * | 3/2001 | McNichols | A61F 13/15601 156/496 |
| 2020/0038256 A1 | | 2/2020 | Jang et al. | |

OTHER PUBLICATIONS

Search Report dated Apr. 24, 2023. 6 pages.

* cited by examiner

*Primary Examiner* — John L Goff, II
(74) *Attorney, Agent, or Firm* — RMCK Law Group PLC

(57) ABSTRACT

A method for producing absorbent sanitary articles including a gasketing element fixed to a chassis, wherein side edges of the gasketing element are fixed to side portions of the chassis while the gasketing element is not stretched in the transverse direction and while the side portions of the chassis are approached to each other.

10 Claims, 8 Drawing Sheets

METHOD AND APPARATUS FOR PRODUCING ABSORBENT SANITARY ARTICLES

CROSS-REFERENCE TO RELATED APPLICATION

This application claims priority to Italian Patent Application No. 102022000021942 filed Oct. 25, 2022. The disclosure of the above applications is incorporated herein by reference in its entirety.

FIELD OF THE INVENTION

The present invention relates to a method for producing absorbent sanitary articles such as, for example, diapers, diaper-pants, incontinence pads for incontinent adults, etc.

The present invention also relates to an apparatus for producing absorbent sanitary articles.

STATE OF THE ART

Absorbent sanitary articles typically have a central body or chassis having a rear section, a front section and a crotch section extending between the rear section and the front section and extending between the user's legs in the condition that the absorbent sanitary article is worn. The chassis normally comprises a topsheet of liquid-permeable material intended to come into contact with the user's skin when the article is worn, a backsheet of impermeable material and an absorbent core sandwiched between the topsheet and the backsheet. The rear section and the front section of the chassis are normally closed around the waist of the user by at least one pair of side panels which project laterally beyond the side edges of the chassis. The side panels may be elastically extensible in the transverse direction.

One of the most common problems with absorbent sanitary articles is the possibility that bodily exudates may leak from the rear or front waist section of the absorbent article. The risk of leakage is higher in the case of semi-solid fecal material that is not absorbed by the absorbent core and that can leak from the space between the waistband of the absorbent sanitary article and the user's skin.

Various solutions have already been proposed in the state of the art, which tend to limit the risk of leakage of solid or semi-solid bodily exudates from the front or rear waist sections of an absorbent sanitary article. One such solution is described in US 2020/0038256 A1. This document discloses an absorbent sanitary article including a chassis and at least one gasketing element applied to the topsheet and having an outer transverse edge attached to the topsheet and an inner transverse edge detached from the topsheet so that, during use, the gasketing element forms a pocket facing the crotch section of the chassis, which may receive and contain solid or semi-solid exudates.

The known solutions that envisage the use of a gasketing element as described in US2020/0038256 A1 do not work correctly if the gasketing element remains adherent to the surface of the topsheet in the condition wherein the absorbent sanitary article is worn. Indeed, in this case the pocket formed between the gasketing element and the topsheet remains closed, and the gasketing element is not in a condition to receive and contain solid or semi-solid exudates.

The known solutions often have problems in ensuring a correct detachment of the inner transverse edge of the gasketing element from the surface of the topsheet in the condition wherein the absorbent sanitary article is worn.

OBJECT AND SUMMARY OF THE INVENTION

The object of the present invention is to provide a method for producing absorbent sanitary articles that solves the problems of the prior art According to the present invention, this object is achieved by a method having the characteristics forming the subject of claim 1.

According to another aspect, the invention relates to an apparatus for producing absorbent sanitary articles having the characteristics forming the subject of claim 9.

Preferred embodiments of the invention form the subject of the dependent claims.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

It will be appreciated that the accompanying drawings are schematic and that—in certain figures—some components may not be shown to assist in understanding the Figures. It will be appreciated that the various figures may also not be represented on the same scale.

DETAILED DESCRIPTION

Figure 1:
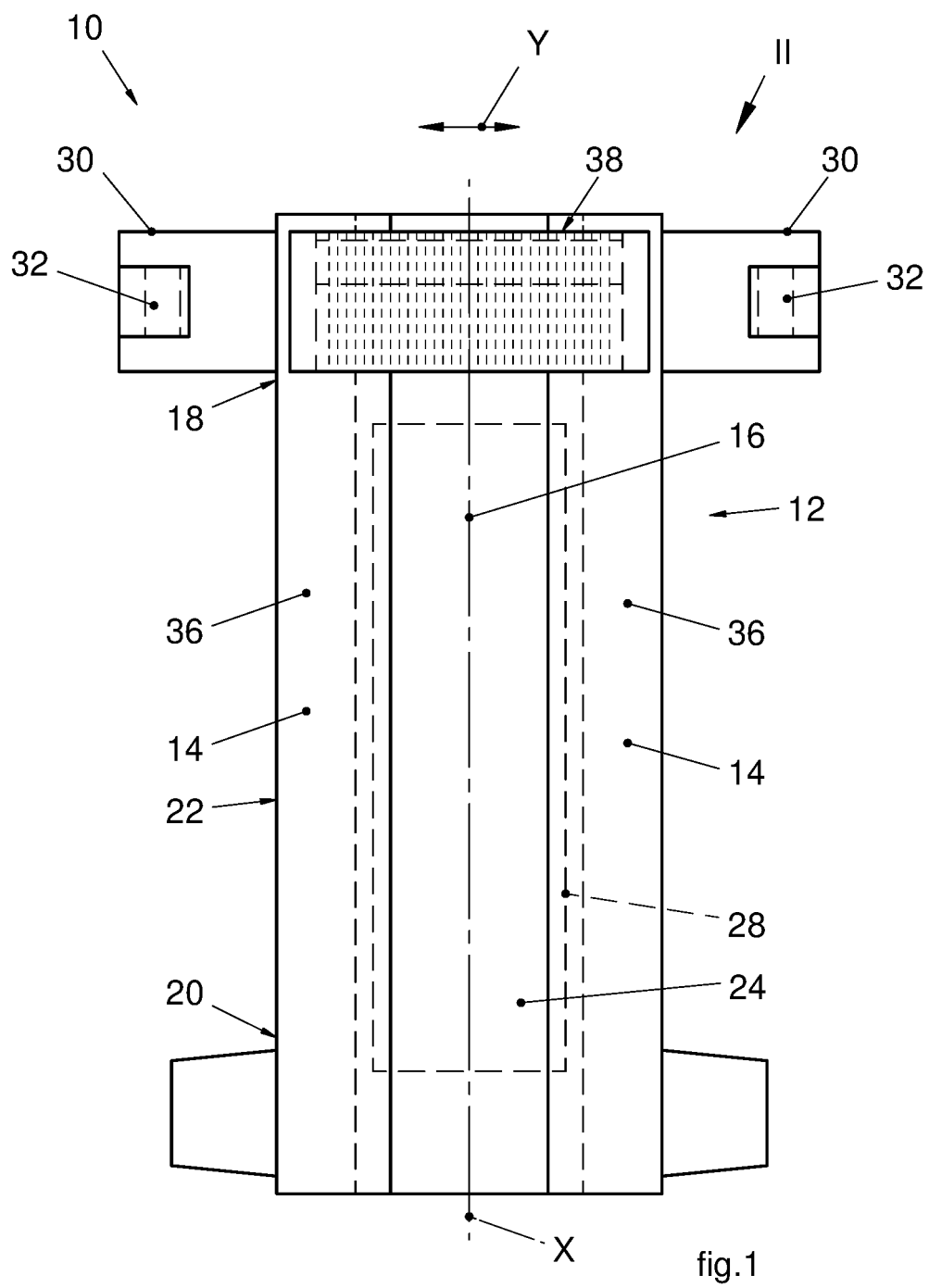
FIG. 1 is a schematic plan view of an absorbent sanitary article in an extended position.
Figure 2:
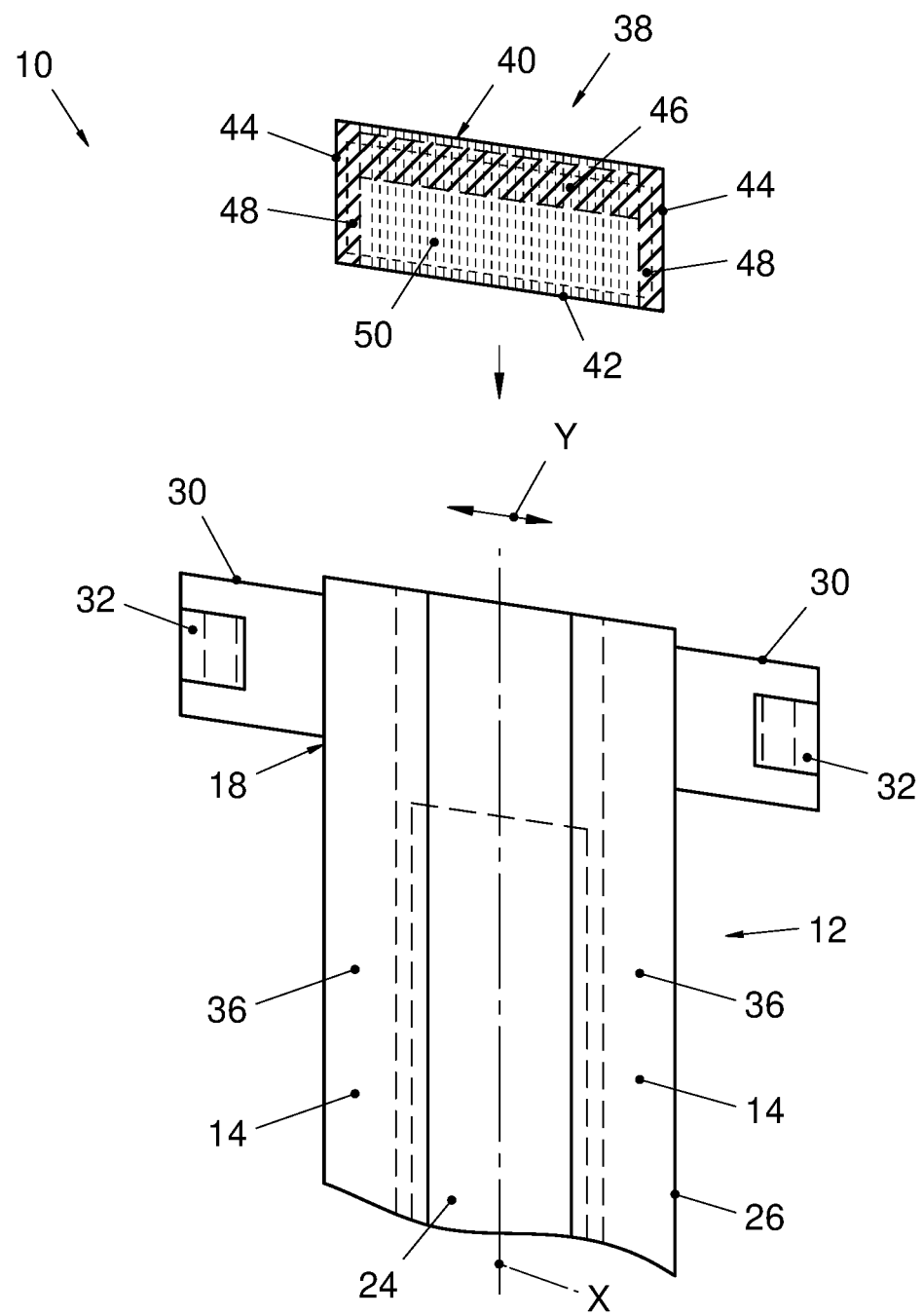
FIG. 2 is a schematic perspective view of the part indicated by the arrow II in FIG. 1.

With reference to FIGS. 1 and 2, numeral 10 indicates a possible embodiment of an absorbent sanitary article that can be produced with a method and apparatus according to the present invention.

The absorbent sanitary article 10 comprises a chassis 12 elongated along a longitudinal axis X. The chassis 12 has two side portions 14 and a central portion 16.

The chassis 12 may have a rectangular shape as illustrated in FIG. 1, in which the edges of the side portions 14 are straight and parallel to the longitudinal axis X. In a possible embodiment, the edges of the side portions 14 may be curved and shaped so as to conform to the user's legs in the configuration wherein the absorbent sanitary article 10 is worn. In this case, the chassis 12 may have substantially an hourglass shape.

The chassis 12 has a rear waist section 18, a front waist section 20 and a crotch section 22, which extends between the rear waist section 18 and the front waist section 20. In a configuration of use, the rear and front waist sections 18, 20 are closed around the waist of the user, and the crotch section 22 extends between the legs of the user.

The chassis 12 comprises a topsheet 24 constituted by a sheet of liquid-permeable material and having an outer surface which—during use—is in contact with the user's skin. The chassis 12 further comprises an impermeable backsheet 26 (FIG. 2) and an absorbent core 28, which is sandwiched between the topsheet 24 and the backsheet 26.

The absorbent sanitary article 10 may comprise at least one pair of side panels 30 extending laterally outwards from respective side portions 14 of the chassis 12 in at least one of the rear and/or front waist sections 18, 20. The side panels 30 may have an elastic portion elastically extensible along a transverse direction Y orthogonal to the longitudinal axis X. Closure formations 32, for example, micro-hook closure formations, may be attached to the distal ends of the side panels 30.

In the case wherein the absorbent sanitary article 10 has only one pair of side panels (usually a pair of rear side panels) the waist section opposite to the one carrying the pair of side panels 30 may have a micro-loop front panel on its outer surface for establishing surface closure with micro-hook closure formations 32.

Figure 7:
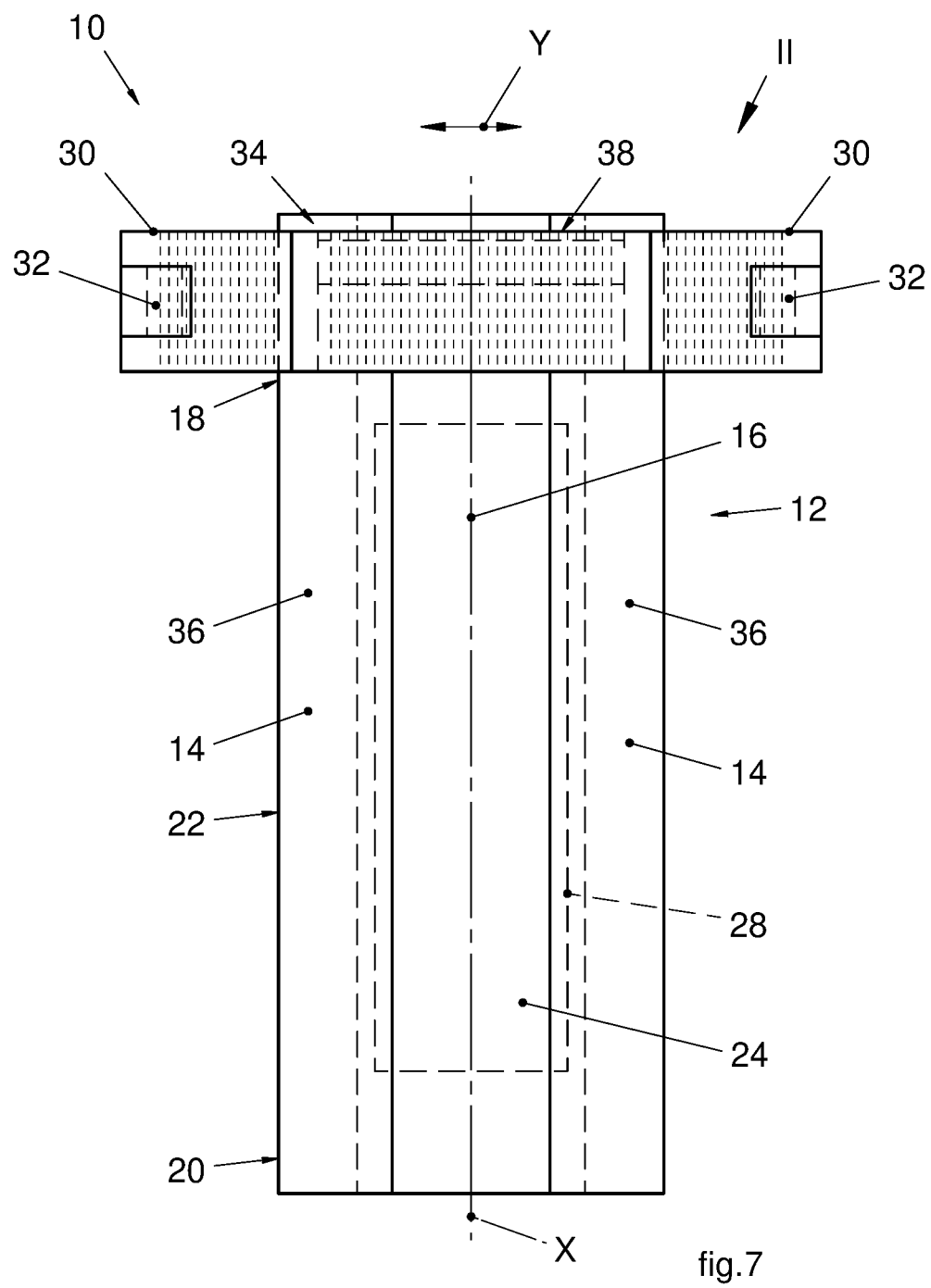
Figure 8:
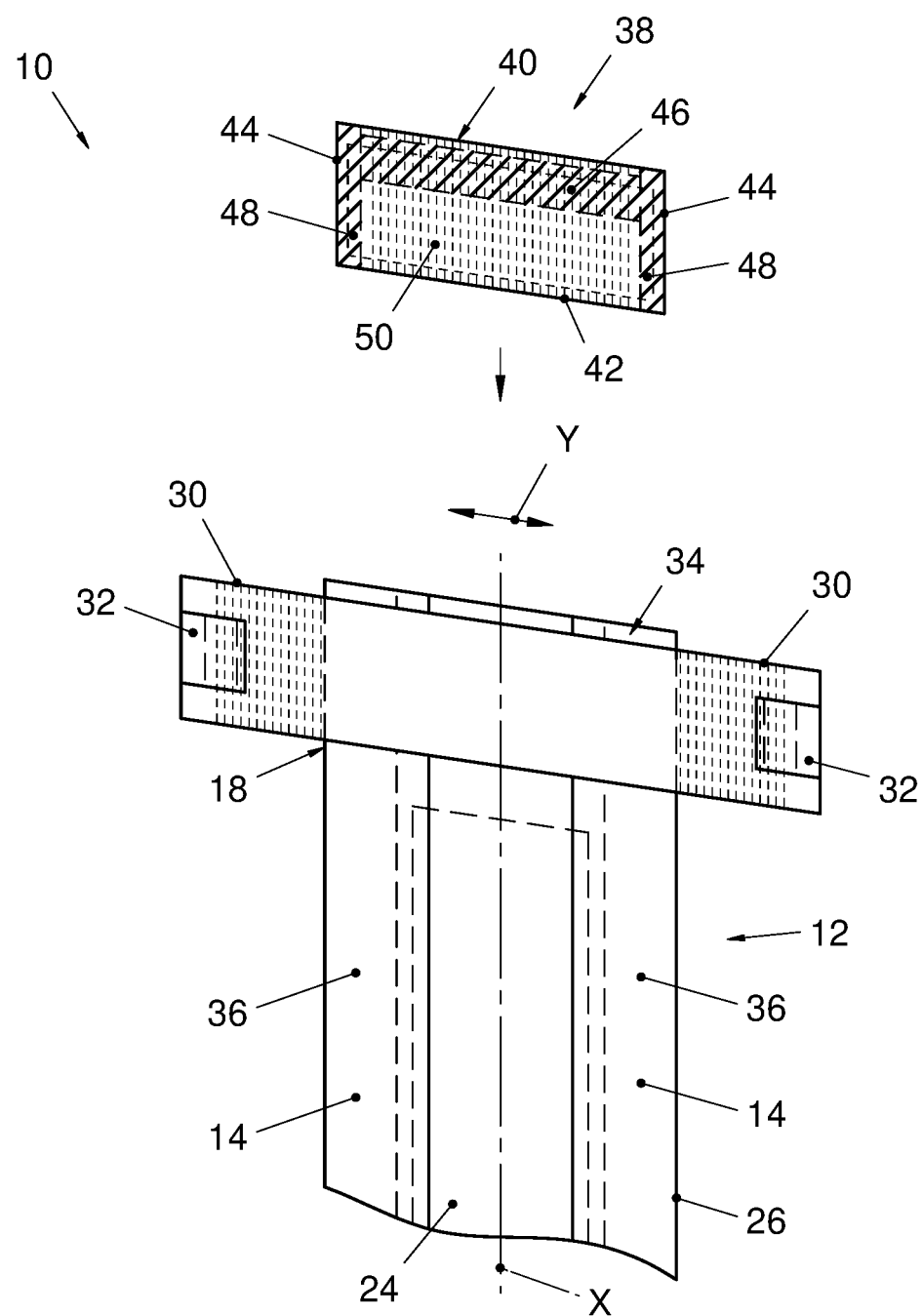

In a possible embodiment illustrated in FIGS. 7 and 8, the side panels 30 may be formed by outer portions of a waistband 34 fixed to the rear waist section 18 of the chassis 12. The waistband 34 may be elastically stretchable in the transverse direction Y and may be attached to the topsheet 24.

The absorbent sanitary article 10 may comprise two leg cuffs 36. The two leg cuffs 36 may be formed by respective strips elongated in the direction of the longitudinal axis X and located along respective side portions 14 of the chassis 12. The leg cuffs 36 may have respective outer edges attached to the chassis 12 and respective inner edges detached from the inner surface of the topsheet 24 and elastically tensioned, so that the inner edges of the leg cuffs 36 in the configuration of use are elastically held in contact with the user's legs and form barriers that help to reduce the leakage of liquid, solid or semi-solid bodily exudates into the crotch section 22 of the chassis 12.

The absorbent sanitary article 10 comprises at least one gasketing element 38 fixed on the side of the chassis 12 facing the user during use in at least one of the rear and front waist sections 18, 20. In the embodiment illustrated by way of example in the figures, the absorbent sanitary article 10 comprises a single gasketing element 38 located in the rear waist section 18. In possible embodiments, the absorbent sanitary article 10 could comprise a rear gasketing element located in the rear waist section 18 and a front gasketing element located in the front waist section 20.

The gasketing element 38 may have the shape of a rectangular strip elongated in the transverse direction Y. The gasketing element 38 is elastically extendable in the transverse direction Y.

In a possible embodiment, the gasketing element 38 may consist of a single layer of an elastic film. In a possible embodiment, the gasketing element 38 may be formed of a composite elastic material, for example, an elastic laminate including an elastic film sandwiched between two non-woven layers anchored to each other and to the elastic film by a pattern of connecting points formed by glue or welding (thermal or ultrasonic). In a possible embodiment, the gasketing element 38 may comprise a plurality of elastic threads or a plurality of elastic tapes sandwiched between two non-woven layers anchored to each other and to the elastic threads or tapes elastic by means of a pattern of connecting points formed by glue or welding (thermal or ultrasonic).

With reference to FIG. 2, the gasketing element 38 comprises an outer transverse edge 40, an inner transverse edge 42 and two side edges 44. The gasketing element 38 is fixed to the chassis 12 along a transverse attachment area 46 adjacent to the outer transverse edge 40 and along two longitudinal attachment areas 48 adjacent to the respective side edges 44.

The attachment areas 46 and 48 form an attachment area between the gasketing element 38 and the chassis 12 having a substantially C shape facing the crotch section 22 of the chassis 12. The inner transverse edge 42 of the gasketing element 38 is detached from the surface of the chassis 12 so as to form a pocket 50 open towards the crotch section 22 of the chassis 12. The pocket 50 is closed on three sides by the attachment areas 46, 48. The attachment areas 46, 48 may be obtained by glue or by welding (thermal or ultrasonic).

In the event that the chassis 12 includes a waistband 34 attached to the topsheet 24, the gasketing element 38 may be attached to the waistband 34. The waistband 34 may have non-elastic areas at the attachment areas 46 and 48.

If a waistband 34 is not provided, the gasketing element 38 may be attached to the topsheet 24 and to the end areas of the leg cuffs 36.

Figure 3:
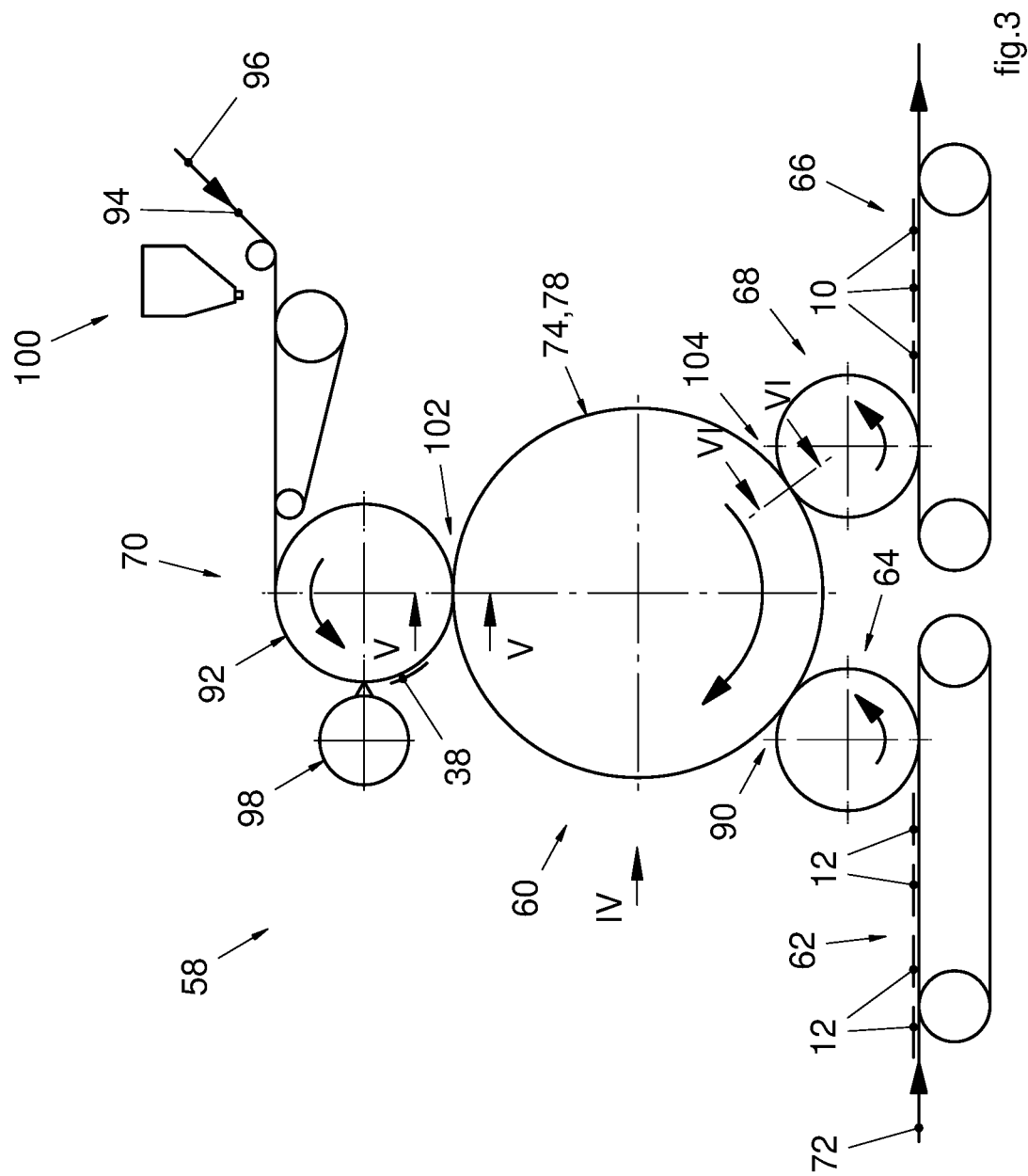
FIG. 3 is a schematic side view of an embodiment of an apparatus according to the present invention.
Figure 4:
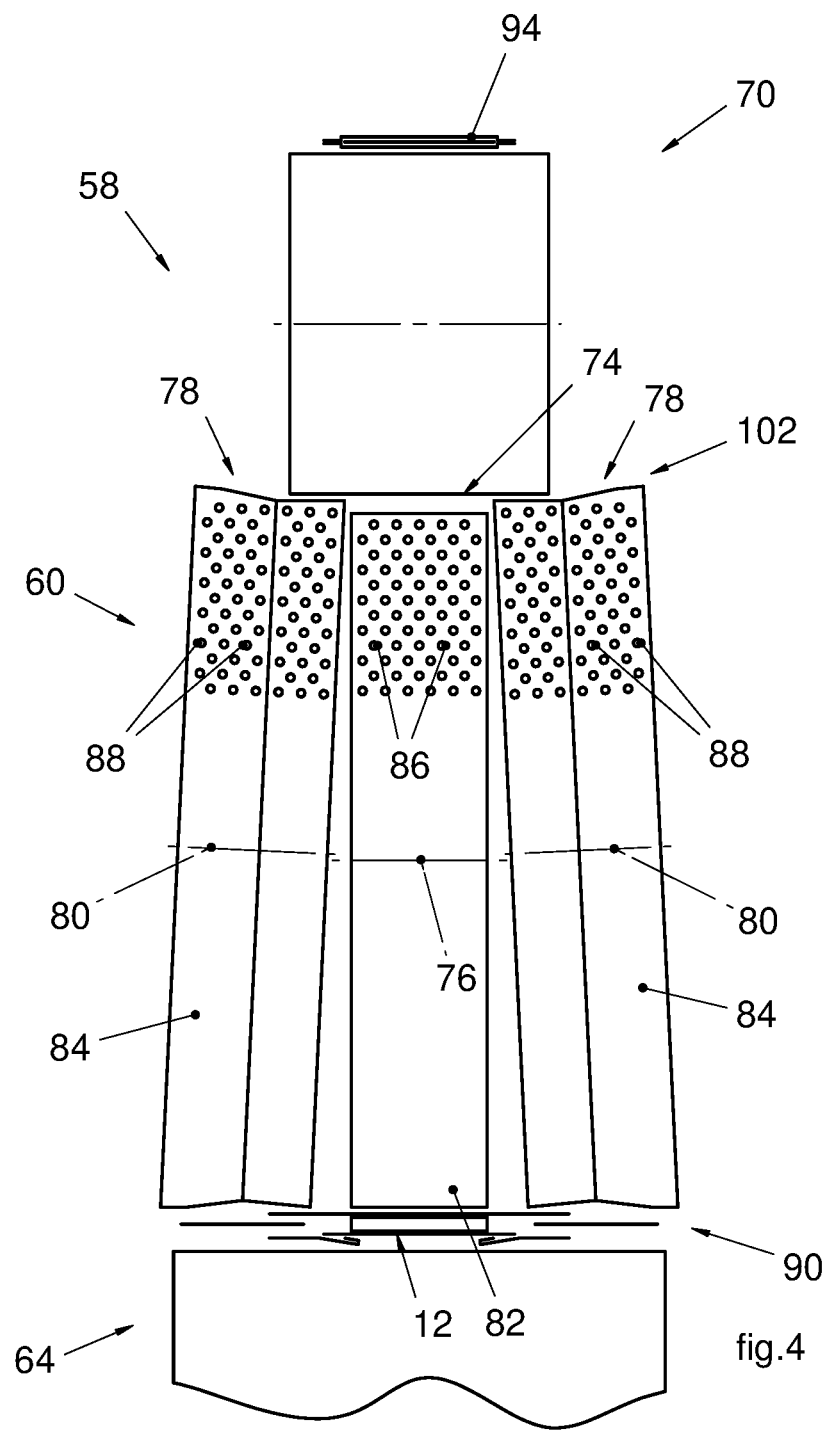
FIG. 4 is a schematic front view according to the arrow IV of FIG. 3, FIGS. 5 and 6 are schematic cross-sections according to the lines V-V and VI-VI of FIG. 3, and FIGS. 7 and 8 are schematic views corresponding to FIGS. 1 and 2 and illustrating a second embodiment of an absorbent sanitary article.

With reference to FIGS. 3 and 4, numeral 58 indicates an apparatus configured for applying gasketing elements 38 to respective chassis 12.

The apparatus 58 comprises a gripping device 60, an inlet conveyor 62, an inlet transfer roller 64, an outlet conveyor 66, an outlet transfer roller 68, and a cut-and-slip unit 70.

The inlet conveyor 62 advances an array of chassis 12 without the gasketing elements 38 in the direction indicated by the arrow 72. In a possible embodiment the array of chassis 12 may be a continuous array. In a possible embodiment the array of chassis 12 may be formed by discrete chassis 12 spaced apart from each other. On the inlet conveyor 62 the chassis 12 are oriented with the respective longitudinal axes X parallel to the direction of advancement 72 and are arranged with the respective topsheets 24 facing upwards.

With reference to FIG. 4, the gripping device 60 may comprise a central disc 74 rotatable around a first rotation axis 76 and two side discs 78 rotatable around respective second rotation axes 80 inclined in directions opposite to each other with respect to the central disc 74. In possible embodiments, the central disc 74 may be omitted and the gripping device 60 may only include the two side discs 78.

The central disc 74 and the two side discs 78 have respective circumferential surfaces 82, 84 provided with gripping elements 86, 88 configured for gripping the side portions 14 and the central portions 16 of the chassis 12, respectively. The gripping elements 86, 88 may include suction holes connected to a suction source. In possible embodiments the gripping elements 86, 88 may include belts or tapes cooperating with the respective circumferential surfaces 82, 84 of the central disc 74 and of the side discs 78 to hold the side portions 14 and the central portions 16 of the chassis 12 in contact with circumferential surfaces 82, 84.

The fact that the two side discs 78 rotate around rotation axes 80 inclined to each other means that the gripping elements 88 of the side discs 78 move cyclically in a transverse direction between a spaced apart position and a close together position, and vice versa.

The inlet transfer roller 64 picks up the chassis 12 from the inlet conveyor 62 and transfers them to the gripping device 60 in a gripping area 90. The central portions 16 of the chassis 12 are gripped by the gripping elements 84 of the central disc 74 and the side portions 14 of the chassis 12 are gripped by the gripping elements 86 of the side discs 78. In the gripping area 90 the side discs 78 of the gripping device 60 are in a position spaced apart from each other. When the chassis 12 are gripped by the gripping device 60 in the gripping area 90 they are in an extended position.

The cut-and-slip unit 70 includes an anvil roller 92 to which a continuous elastic sheet 94 is fed in a direction 96 parallel to its longitudinal axis. The continuous elastic sheet 94 is elastically extensible in a direction transverse to its longitudinal axis. The continuous elastic sheet 94 fed to the cut-and-slip unit 70 may come from a reel or may be produced in line starting from reels of elastic film and reels of non-woven fabric coupled together to form an elastic laminate.

The cut-and-slip unit 70 comprises a knife roller 98 that cooperates with the anvil roller 92 to transversely cut the continuous elastic sheet 94. After cutting, successive gasketing elements 38 are formed on the outer surface of the anvil roller 92 and are held on the outer surface of the anvil roller 92, for example, by suction. The gasketing members 38 are held on the outer surface of the anvil roller 92 in an untensioned state in the transverse direction.

The anvil roller 92 has a peripheral speed greater than the feeding speed of the continuous elastic sheet 94 so that, after cutting, the gasketing elements 38 on the outer surface of the anvil roller 92 are spaced apart from each other in the direction of advancement.

A glue dispensing device 100 may be arranged upstream of the anvil roller 92, configured to apply a pattern of glue on the continuous elastic sheet 94. After the transverse cut, each of the gasketing elements 38 may have a C-shaped glue layer on its surface, with two side glue strips adjacent to the side edges 44 and a transverse glue strip adjacent to the outer transverse edge 40.

The anvil roller 92 transfers the gasketing elements 38 to the gripping device 60 in an application area 102 in positions spaced apart from each other in the longitudinal direction. In the application area 102 the gasketing elements 38 are in a non-tensioned state in the transverse direction.

Figure 5:
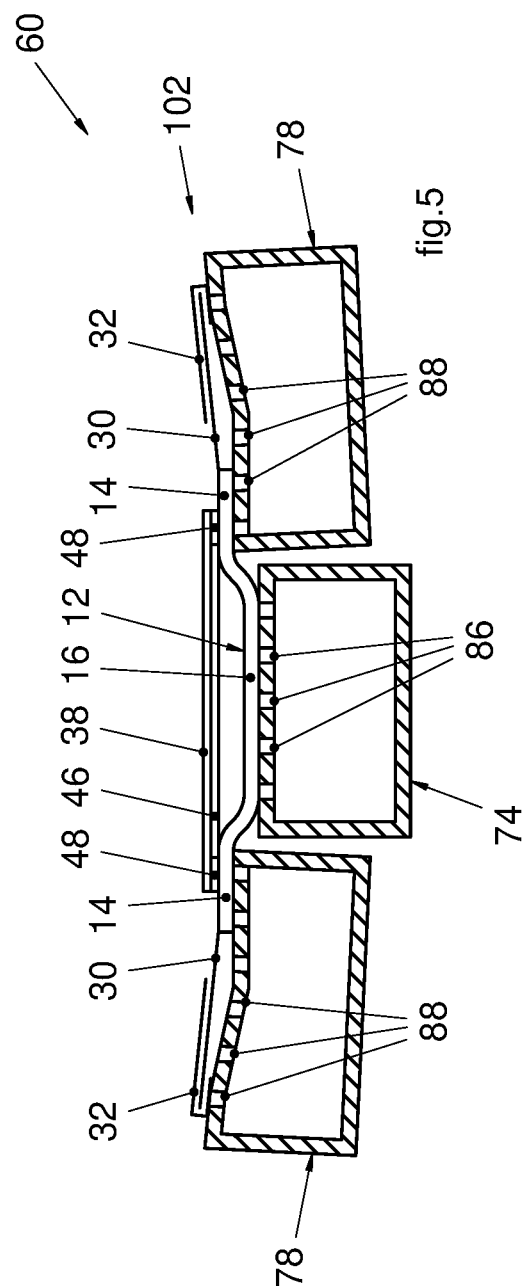

In the application area 102, the side discs 78 of the gripping device 60 are in a position close to each other. With reference to FIG. 5, in the application area 102, the side portions 14 of the chassis 12 are brought close together in a transversal direction. Following the transversal approach of the side portions 14, the chassis 12 may assume a concave shape with the central portions 16 of the chassis 12 located in a lowered position with respect to the side portions 14.

The anvil roller 92 applies the gasketing elements 38 in a non-tensioned condition in a transverse direction to respective chassis 12 while the side portions 14 of the chassis 12 are approached to each other. The outer side edges 44 of the gasketing elements 38 are applied to corresponding side portions 14 of the respective chassis 12 while the side portions 14 are approached to each other. The outer side edges 44 of the gasketing elements 38 may be fixed by glue to the corresponding side portions 14 of the chassis 12.

With reference to FIG. 3, after applying the gasketing elements 38 to the respective chassis 12 in the application area 102, the chassis 12 advance towards a detachment area 104, in which the outlet transfer roller 68 picks up the chassis 12 equipped with respective gasketing elements 38 and transfers them onto the outlet conveyor 66.

Figure 6:
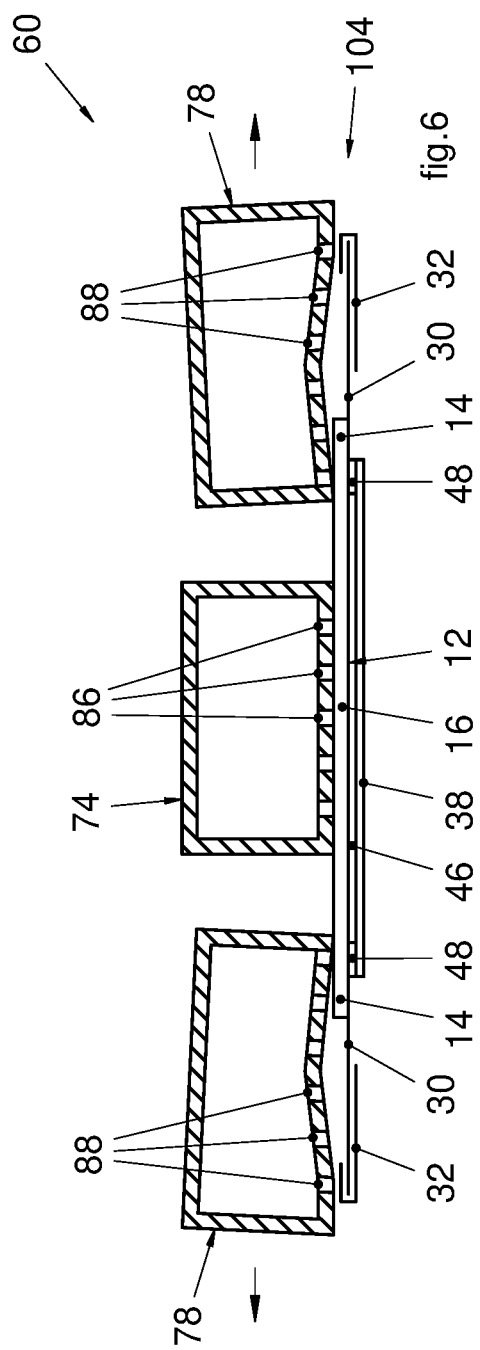

During the journey from the application area 102 towards the detachment area 104, the side discs 78 of the gripping device 60 move away from each other in a transverse direction. Therefore, the chassis 12 are brought from the concave configuration they have in the application station 102 to an extended configuration in the detachment station 104, as illustrated in FIG. 6.

During the stretching in the transverse direction of the chassis 12, the gasketing elements 38 are elastically stretched in the transverse direction. The outer transverse edges 40 of the gasketing elements 38 are fixed to the respective chassis 12 while the chassis 12 are in an extended position.

In a possible embodiment, the attachment of the gasketing elements 38 to the chassis 12 may be carried out by thermal or ultrasonic welding, as an alternative or in addition to fixing by glue.

Finished absorbent sanitary articles 10 in an extended position are collected on the outlet conveyor 66, which can then be folded and packaged according to methods known in the field.

When an absorbent sanitary article 10 is worn, the rear and front waist sections 18, 20 are stretched around the user's waist. In this way, the gasketing element 38 is stretched elastically in the transverse direction Y before closing the absorbent sanitary article 10 around the user's waist by the closure formations 32.

During the elastic stretching in the transverse direction of the gasketing element 38, the inner transverse edge 42 of the gasketing element 38 detaches from the surface of the topsheet 24 or the waistband 34. This ensures that, when the absorbent sanitary article 10 is worn, the pocket 50 formed between the gasketing element 38 and the topsheet 24 or the waistband 34 is open and in the best conditions for receiving and containing solid or semi-solid body exudates remaining between the skin of the user and the topsheet 22.

As indicated above, the absorbent sanitary article 10 may have a single gasketing element 38 located in only one of the waist sections 18 or 20 (for example, the rear waist section 18, which is the one most exposed to receiving solid or semi-solid body exudates) or it may comprise two gasketing elements 38, each configured as previously described and located, respectively, in the rear waist section 18 and in the front waist section 20.

The apparatus 58 previously described during operation implements a method comprising:
  providing an array of chassis 12 having rear and front waist sections 18, 20 and respective longitudinal axes X,
  advancing the array of chassis 12 in the direction of their longitudinal axes X,
  gripping side portions 14 of the chassis 12 in extended positions and approaching the side portions 14 to each other in a transverse direction,
  providing an array of gasketing elements 38 elastically extensible in a transverse direction and having respective side edges 44,
  applying and fixing side edges 44 of the gasketing elements 38 to side portions 14 of the chassis 12 while the gasketing elements 38 are not stretched in a transverse direction and while the side portions 14 of the chassis 12 are approached to each other.

The method may also envisage returning the chassis 12 to an extended configuration after attaching the side edges 44 of the gasketing elements 38 to the side portions of the chassis 12.

The method may involve attaching the outer transverse edges 40 of the gasketing elements 38 to the chassis 12 after the chassis 12 have been returned to the extended configuration.

Applying and attaching the gasketing element to the chassis in an elastically unstretched state in the transverse direction simplifies the process and apparatus considerably. The attachment of the gasketing elements to the side portions of the chassis while these side portions are approached to each other ensures that the inner transverse edges of the gasketing elements are elastically stretched in the transverse direction in the condition wherein the absorbent sanitary articles are worn, so that the pockets formed by the gasketing elements are open and in the best conditions to receive and contain solid or semi-solid body exudates remaining between the user's skin and the topsheet.

Of course, without prejudice to the principle of the invention, the details of construction and the embodiments can be widely varied with respect to those described and illustrated, without thereby departing from the scope of the invention as defined by the claims that follow.

The invention claimed is:

1. A method for producing absorbent sanitary articles, comprising:
    providing an array of chassis having rear and front waist sections and respective longitudinal axes,
    advancing said array of chassis in a direction of said longitudinal axes,
    gripping side portions of each chassis of said array of chassis in extended positions and approaching said side portions to each other in a transverse direction,
    providing an array of gasketing elements, each gasketing element being elastically extensible in a transverse direction and having respective side edges,
    applying and fixing said side edges of each gasketing element to said side portions of each chassis while said each gasketing element is not stretched in a transverse direction and while said side portions of said each chassis are approached to each other.

2. The method of claim 1, comprising returning said each chassis to an extended configuration with the side portions in the extended position after fixing said side edges of said each gasketing element to said side portions of said each chassis.

3. The method of claim 2, comprising fixing outer transverse edges of said each gasketing element to said each chassis after said each chassis has been brought back to the extended configuration.

4. The method of claim 1, comprising:
    providing a continuous elastic web movable in the direction of its longitudinal axis,
    transversely cutting said continuous elastic web so as to form a plurality of gasketing elements, and
    spacing apart said plurality of gasketing elements from each other in a longitudinal direction forming the array of gasketing elements and applying said array of gasketing elements to said array of chassis.

5. The method of claim 1, comprising:
    providing a pair of side discs rotatable around respective axes of rotation inclined to each other,
    gripping side portions of said each chassis on circumferential surfaces of the side discs in a gripping area in which said side discs are spaced apart from each other by a first distance, and
    applying said each gasketing element to said each chassis in an application area in which said side discs are spaced close to each other at a second distance apart that is less than said first distance.

6. The method of claim 5, comprising detaching said each chassis from said side discs in a detachment area in which said side discs are spaced apart from each other by the first distance.

7. The method of claim 5, comprising:
    providing a central disc arranged between said side discs and rotatable around an axis of rotation, wherein the axes of rotation of said side discs are inclined in opposite directions with respect to the axis of rotation of said central disc, and
    gripping central portions of said each chassis on a circumferential surface of said central disc and holding said each chassis in a concave configuration in said application area.

8. The method of claim 1, wherein said array of chassis is a continuous array.

9. An apparatus for producing absorbent sanitary articles, comprising:
    an inlet conveyor configured to advance an array of chassis in a direction of their longitudinal axes,
    a gripping device configured to grip side portions of each chassis of said array of chassis in extended positions and approach said side portions to each other in a transverse direction,
    a cut-and-slip unit configured to form an array of gasketing elements each being elastically extendable in the transverse direction and having respective side edges and to apply and fix side edges of each gasketing element to side portions of each chassis of said array of chassis while each gasketing element is not stretched in the transverse direction and while said side portions of each chassis are approached to each other.

10. The apparatus of claim 9, wherein:
    said gripping device comprises a pair of side discs rotatable around respective axes of rotation inclined to each other and having circumferential surfaces provided with gripping elements, and
    wherein in a gripping area said side discs are spaced apart from each other in a transverse direction by a first distance and wherein in an application area said side discs are approached to each other at a second distance apart which is less than the first distance.

* * * * *